United States Patent Office 3,106,554
Patented Oct. 8, 1963

3,106,554
METHOD FOR PREPARING 2,4-BIS-ALKYL-6-HYDROXY-1,3,5-TRIAZINES
Ehrenfried H. Kober, Hamden, Conn., assignor to Olin Mathieson Chemical Corporation, a corporation of Virginia
No Drawing. Filed May 23, 1961, Ser. No. 111,902
3 Claims. (Cl. 260—248)

This application is a continuation-in-part of copending application Serial Number 817,989, filed June 4, 1959, now abandoned.

This invention relates to a novel method for the preparation of 2,4-bis-alkyl-hydroxy-1,3,5-triazines of the general formula:

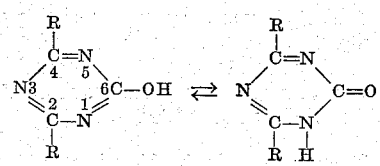

wherein R is an alkyl radical. More particularly, the invention relates to the preparation of 2,4-bis-alkyl-6-hydroxy-1,3,5-triazines by the reduction of 2,4-bis-haloalkyl-6-hydroxy-1,3,5-triazine tertiary amine salts with hydrogen in the presence of one of the common hydrogenation catalysts including Raney nickel and platinum or palladium on carbon.

Triazine derivatives, useful as starting materials in the process of this invention, include the 2,4-bis-haloalkyl-6-hydroxy-1,3,5-triazine tertiary amine salts in which the haloalkyl radical preferably contains from 1 to 4 carbon atoms although haloalkyl radicals containing up to 12 carbon atoms are included in the scope of this invention and in which the α carbon atom of the haloalkyl radical has at least two halogen substituents such as 2,4-bis-trichloromethyl-6-hydroxy-1,3,5-triazine triethylamine salt, 2,4-bis-trichloromethyl-6-hydroxy-1,3,5-triazine tri-n-butylamine salt, 2,4-bis-trichloromethyl-6-hydroxy-1,3,5-triazine N-ethylpiperidine salt, 2,4-bis-trichloromethyl-6-hydroxy-1,3,5-triazine N-methylmorpholine salt, 2,4-bis-α,α-dichloroethyl-6-hydroxy-1,3,5-triazine tri-n-propylamine salt and 2,4-bis-pentachloroethyl-6-hydroxy-1,3,5-triazine N-ethylpiperidine salt which can be prepared by the method described and claimed in the pending application Serial No. 817,988, filed June 4, 1959. The corresponding fluorine, bromine and iodine derivatives are also useful starting materials.

The 2,4-bis-alkyl-6-hydroxy-1,3,5-triazines prepared by the process of this invention are useful in making 2,4-bis-alkyl-6-halo-1,3,5-triazines of the general formula:

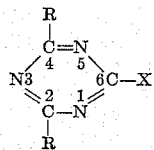

wherein R is an alkyl radical and X is a holgen, by reaction with phosphorus oxyhalide. These halo-triazines are described and claimed in United States Patent 2,880,207. They are useful as fungicides and intermediates.

A method for the preparation of 2,4-bis-alkyl-6-hydroxy-1,3,5-triazines is described in United States Patent 2,832,778. In this process, monohydroxy triazine amidine salts are treated with hydrogen chloride which results in the formation of an amidine hydrochloride and the precipitation of the monohydroxy triazine hydrochloride hydrate. The latter compound is then converted to the free hydroxy triazine by treatment with an alkali such as alkaline earth or alkali metal hydroxides. The monohydroxy triazine amidine salts, utilized in the process of United States 2,832,778, are described and claimed in United States Patent 2,876,221 and are produced by catalytic hydrogenolysis of haloalkyl hydroxy triazine amidines, prepared from phosgene and haloalkyl amidines.

The method of this invention offers many advantages over the previously described process, in that 2,4-bis-alkyl-6-hydroxy-1,3,5-triazines are conveniently and easily prepared in one step by reduction of 2,4-bis-haloalkyl-6-hydroxy-1,3,5-triazine tertiary amine salts in the presence of one of the common hydrogenation catalysts. In addition, the triazine tertiary amine salts are much less expensive starting materials than the corresponding triazine amidine salts.

A wide variety of catalysts can be employed in the process of this invention. Useful catalysts include platinum, palladium, rhodium, osmium, iridium, nickel, copper, cobalt, chromium, iron, tin, silver, molybdenum, tungsten, titanium, etc. Besides the free metals, the sulfides of nickel, iron, tin, copper, etc. as well as the oxides of such metals as iron, cobalt, and copper can be used. The catalysts can be utilized singly or in combination and, in addition, carriers such as clays, carbon, pumice, magnesia, alumina, silica, etc. can be employed if desired. In general, the temperature of the reaction can be varied from about −10° C. to about 250° C. with the preferred temperature being from about 10° C. to about 100° C. In a like manner, the pressure of the reaction can also be varied widely from about 1 p.s.i.g. to 2000 p.s.i.g. or higher. The ease of this catalytic hydrogenolysis is surprising, since other halogen compounds of the triazine series, particularly those bearing halogen directly on the triazine ring, act as hydrogenation catalyst poisons.

The following examples illustrate further this invention and are to be considered as not limitative.

*Example I*

A mixture of 8.6 grams (0.02 mole) of the triethylamine salt of the 2,4-bis-trichloromethyl-6-hydroxy-1,3,5-triazine, 12.32 grams (0.12 mole) of triethylamine, 12 grams of 2 percent palladium on carbon, and 150 milliliters of methanol was shaken at room temperature with hydrogen. After the absorption of hydrogen was complete, the catalyst was filtered off by suction and a solution of 4.8 grams (0.12 mole) of sodium hydroxide in 50 milliliters of methanol was added to the filtrate, whereby the triethylamine hydrochloride was converted into triethylamine and sodium chloride. After the precipitated sodium chloride was removed by filtration, the filtrate was evaporated to dryness at reduced pressure. The residue was taken up with absolute ethanol, a further crop of insoluble sodium chloride removed by filtration and the 2,4-dimethyl-6-hydroxy-1,3,5-triazine precipitated with ether. The precipitate was sublimed in vacuo, yielding 2.0 grams or 80 percent of the theoretical quantity of pure 2,4-dimethyl-6-hydroxy-1,3,5-triazine of a melting point of 236°–237° C. A mixed melting point with an authentic sample showed no depression.

*Example II*

A mixture of 8.9 grams (0.02 mole) of the N-ethylpiperidine salt of the 2,4-bis-trichloromethyl-6-hydroxy-1,3,5-triazine, 13.6 grams (0.12 mole) of N-ethylpiperidine, 12 grams of 2 percent palladium on carbon, and 150 milliliters of methanol was shaken at room temperature with hydrogen. After the absorption of hydrogen was complete, the reaction mixture was worked up as described in Example I, whereupon 2.1 grams or 84 percent of the theoretical quantity of the 2,4-dimethyl-6-hydroxy-1,3,5-triazine, melting point 234°–237° C., was obtained.

What is claimed is:

1. The process of preparing 2,4-bis-alkyl-6-hydroxy-1,3,5-triazines which comprises reducing a 2,4-bis-haloalkyl-6-hydroxy-1,3,5-triazine tertiary amine salt of the general formula:

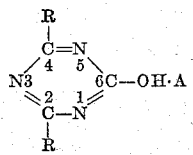

wherein R is a chloroalkyl radical having not more than 12 carbon atoms and having at least two halogen substituents on the α carbon atom and A is a teriary amine selected from the group consisting of trialkylamines of the formula R′₃N wherein R′ is an alkyl radical having from 1 to 7 carbon atoms, and N-alkyl-heterocyclic amines of the formula:

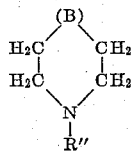

wherein B is selected from the group consisting of oxygen and the methylene radical and R″ is an alkyl radical having from 1 to 4 carbon atoms, with hydrogen in the presence of a hydrogenation catalyst selected from the group consisting of platinum, palladium, and rhodium and at a temperature of from about −10° C. to about 250° C.

2. The process of claim 1 in which the catalyst is palladium on carbon.

3. The process of preparing 2,4-dimethyl-6-hydroxy-1,3,5-triazine which comprises reducing a 2,4-bis-trichloromethyl-6-hydroxy-1,3,5-triazine tertiary amine salt of the general formula:

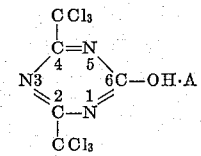

wherein A is a tertiary amine selected from the group consisting of trialkylamines of the formula R′₃N wherein R′ is an alkyl radical having from 1 to 7 carbon atoms, and N-alkyl-heterocyclic amines of the formula:

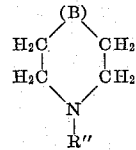

wherein B is selected from the group consisting of oxygen and the methylene radical and R″ is an alkyl radical having from 1 to 4 carbon atoms, with hydrogen in the presence of a palladium on carbon catalyst at a temperature of from about 10° C. to about 100° C.

References Cited in the file of this patent

UNITED STATES PATENTS

| | | |
|---|---|---|
| 2,832,778 | Schroeder et al. | Apr. 29, 1958 |
| 2,876,221 | Schroeder et al. | Mar. 3, 1959 |
| 2,880,207 | Schroeder et al. | Mar. 31, 1961 |

OTHER REFERENCES

Berkman et al.: "Catalysis," pages 826, 828, 837, 855, 864, 866 and 868 Reinhold Pub. Corp., 1940.